(12) United States Patent
Chao et al.

(10) Patent No.: US 7,904,195 B2
(45) Date of Patent: Mar. 8, 2011

(54) METHOD FOR PROGNOSTIC MAINTENANCE IN SEMICONDUCTOR MANUFACTURING EQUIPMENTS

(75) Inventors: Chung-Pei Chao, Taipei County (TW); Chin-Long Chen, Hsinchu (TW)

(73) Assignee: Inotera Memories, Inc., Taoyuan County (TW)

( * ) Notice: Subject to any disclaimer, the term of this patent is extended or adjusted under 35 U.S.C. 154(b) by 303 days.

(21) Appl. No.: 12/243,370

(22) Filed: Oct. 1, 2008

(65) Prior Publication Data

US 2009/0306804 A1    Dec. 10, 2009

(30) Foreign Application Priority Data

Jun. 6, 2008 (TW) .............................. 97121198 A

(51) Int. Cl.
| | |
|---|---|
| G06F 19/00 | (2011.01) |
| G06F 11/30 | (2006.01) |
| G06F 15/18 | (2006.01) |
| G06F 11/00 | (2006.01) |
| G21C 17/00 | (2006.01) |
| H03F 1/26 | (2006.01) |
| H04B 15/00 | (2006.01) |
| G06E 1/00 | (2006.01) |
| G06E 3/00 | (2006.01) |
| G06G 7/00 | (2006.01) |

(52) U.S. Cl. ......... 700/177; 700/110; 702/184; 702/185; 702/190; 706/20; 706/21; 706/22; 714/26; 714/46

(58) Field of Classification Search .................... 700/21, 700/96, 103, 108–110, 121, 174, 177; 702/81–84, 702/182–185, 189, 190; 706/14–16, 20–22; 714/25, 26, 33, 46
See application file for complete search history.

(56) References Cited

U.S. PATENT DOCUMENTS

| | | | | |
|---|---|---|---|---|
| 5,761,383 | A * | 6/1998 | Engel et al. ..................... | 706/14 |
| 6,519,575 | B1 * | 2/2003 | Goebel ......................... | 706/20 |
| 7,242,995 | B1 * | 7/2007 | Morgenson et al. .......... | 700/103 |
| 7,401,066 | B2 * | 7/2008 | Beinglass et al. ..................... | 1/1 |
| 7,487,059 | B2 * | 2/2009 | Davis et al. ................... | 702/116 |
| 7,536,277 | B2 * | 5/2009 | Pattipatti et al. .............. | 702/183 |
| 7,581,434 | B1 * | 9/2009 | Discenzo et al. ............ | 73/53.01 |
| 2006/0129257 | A1 * | 6/2006 | Chen et al. ..................... | 700/96 |
| 2007/0067678 | A1 * | 3/2007 | Hosek et al. .................... | 714/25 |
| 2008/0082197 | A1 * | 4/2008 | Lacaille ........................ | 700/121 |
| 2008/0141072 | A1 * | 6/2008 | Kalgren et al. ................ | 714/33 |
| 2008/0312783 | A1 * | 12/2008 | Mansouri et al. ............... | 701/29 |

* cited by examiner

Primary Examiner — Crystal J Barnes-Bullock
(74) Attorney, Agent, or Firm — Rosenberg, Klein & Lee

(57) ABSTRACT

A method for prognostic maintenance in semiconductor manufacturing equipments is disclosed. The said method comprising: collecting a plurality of raw data from the default detection and classification system for equipments, preprocessing the raw data, using the neural network model (NN model) to find a plurality of health indices, generating health information by using the principal component analysis (PCA) to identify the health indices, and using the partial least square discriminated analysis (PLS-DA) to find a health report. The health report provides the engineers with current risk levels of equipments. By the health report, the engineers can initiate prognostic maintenance and repair the equipments early.

18 Claims, 5 Drawing Sheets

METHOD FOR PROGNOSTIC MAINTENANCE IN SEMICONDUCTOR MANUFACTURING EQUIPMENTS

BACKGROUND OF THE INVENTION

1. Field of the Invention

The present invention is related to a prognostic method; in particular, to a method for prognostic maintenance in semiconductor manufacturing equipments, which performs statistic analyses on significantly massive and complicated raw data outputted by semiconductor equipments, allowing in-situ engineers to predict the health level for prognostic repairs and maintenance on semiconductor equipments.

2. Description of Related Art

As semiconductor manufacturing technologies evolve, the surface area of integrated circuit has been largely reduced, which means small or minor defects generated during semiconductor processes may turn out to be critical factors for integrated circuit quality. Therein, the generation of defects may be caused by many potential problems, and one of these problems may be the health level of aging semiconductor equipments, which causes reduction in wafer yield. Therefore, four methods are commonly applied on current semiconductor equipments for repairs and maintenance so as to increase wafer yield:

1. Breakdown Maintenance (BDM)

This belongs to unplanned equipment repair; that is, engineers perform repairs and maintenance upon the occurrence of damage, breakdown, or failure in the semiconductor equipments.

2. Usage-Based Preventive Maintenance (UBM)

According to the times of usages in the semiconductor equipments, engineers perform repairs and maintenance thereon when a predetermined usage number is reached.

3. Time-Based Preventive Maintenance (TBM)

According to the duration of usages in the semiconductor equipments, engineers perform repairs and maintenance thereon when a predetermined duration of usage time is reached.

4. Condition-Based Maintenance (CBM)

It monitors the semiconductor equipments and collects monitor data, and then engineers determine whether it is required to perform repairs and maintenance based on the collected monitor data.

Nevertheless, the above-mentioned approaches of quantity-based maintenance as well as time-based maintenance can not prevent occurrence of failure in the semiconductor equipments beforehand, and even by means of the methods such as the said CBM, regarding the collected monitor data, there is currently still no effective methodology to predetermine the health condition of the semiconductor equipments at an early stage, so as to let engineers be able to perform repairs and maintenance on the semiconductor equipments before the problems therein generate undesirable impact on the wafer yield.

Presently, in the field of semiconductor, engineers use the Fault Detection and Classification (FDC) system to analyze the output data of the semiconductor equipments in order to be aware of the reasons causing wafer defects, so as to enabling appropriate adjustment on the semiconductor equipments by engineers, facilitating trouble shooting procedures and wafer yield enhancement. Initially, the FDC system is used to perform defect inspections, and presents the inspection result in a trend chart; then, engineers observe the variation in the generated trend chart for making decisions according to professional experiences in engineers themselves, so as to locate the causes of such defects (as the flowchart shown in FIG. 1); wherein the data provided by the semiconductor equipments is complicated and massive, thus the trend chart need to display a huge amount of information, and engineers have to spend much time on viewing the changes in the generated trend chart, thereby causing difficulties in problem analysis and tracking for engineers, and less able to control the health level of various semiconductor equipments, which accordingly leading to poor performance on semiconductor equipment management, thus unnecessarily wastes plenty of extra resources on problem finding yet with end results of incapability of wafer yield enhancement.

Presently, for example, a method is often used in the field of semiconductor for defect inspection parameter analysis (refer to FIG. 2), which can be used to analyze a plurality of lots of products. Each lot of products respectively has a lot number and is fabricated by means of a plurality of machineries; wherein one or more wafers in each lot of products pass through at least one defect inspection of product to generate a defect inspection parameter, and engineers determine where the problem is located in such a process chain which leads to undesirable wafer yield drop based on the information presented by these parameters. However, the solution provided by the above-said patent is excessively sophisticated, and engineers are required to set many rules to facilitate defect inspection analyses, as a result, it consumes too much time on rule building, leading to poor efficiency in resource application and less preferable practical usability.

As such, the inventors of the present invention have considered the aforementioned improvable defects and herein proposed the present invention with reasonable design and effectiveness in resolving the said drawbacks.

SUMMARY OF THE INVENTION

The major objective of the present invention is to provide a method for prognostic maintenance in semiconductor manufacturing equipments, which generates a health report by processing check data provided by the semiconductor equipments, providing in-situ engineers with useful information for prognostic repairs and maintenance, allowing the prevention of failure occurrence in the semiconductor equipments and accordingly improve wafer yield.

To achieve the above-mentioned objective, the present invention provides a method for prognostic maintenance in semiconductor manufacturing equipments, comprising the following steps: collecting a plurality of raw data and preprocessing the plurality of collected raw data; then performing classification through a statistic classification model on the plurality of preprocessed raw data to generate a plurality of health indices; performing classification on the plurality of generated health indices by a prescribed classification method to generate a plurality of health information; next, using a regression analysis method to process the plurality of health information to generate a plurality of health reports; finally, actively performing repairs and maintenance by in-situ engineers based on the plurality of generated health reports.

The present invention provides the following beneficial effects:

1. by using the method of the present invention, it is possible to lessen the massive raw data, allowing for the reduction of system cost and system complexity;

2. straight-forward processes facilitate simplification of complicated raw data analyses;

3. by using the method of the present invention, it is possible to predict the health level in the semiconductor equipments, enabling active repairs and maintenance of the semiconductor equipments by in-situ engineers;

4. performance of semiconductor equipment control and management can be improved, save much analysis time and manpower;

5. before occurrences of failure or breakdown in the semiconductor equipments, it is possible to notify in-situ engineers to perform repairs or maintenance beforehand, so as to extend lifespan of the semiconductor equipments and provide enhanced wafer yield.

For further understanding the characteristics and technical contents of the present invention, references are made to the detailed descriptions and appended drawing of the present invention; however, the appended drawings are simply for the purposes of reference and illustration, rather than being used to limit the scope of present invention thereto.

DETAILED DESCRIPTION OF PREFERRED EMBODIMENTS

Figure 1:
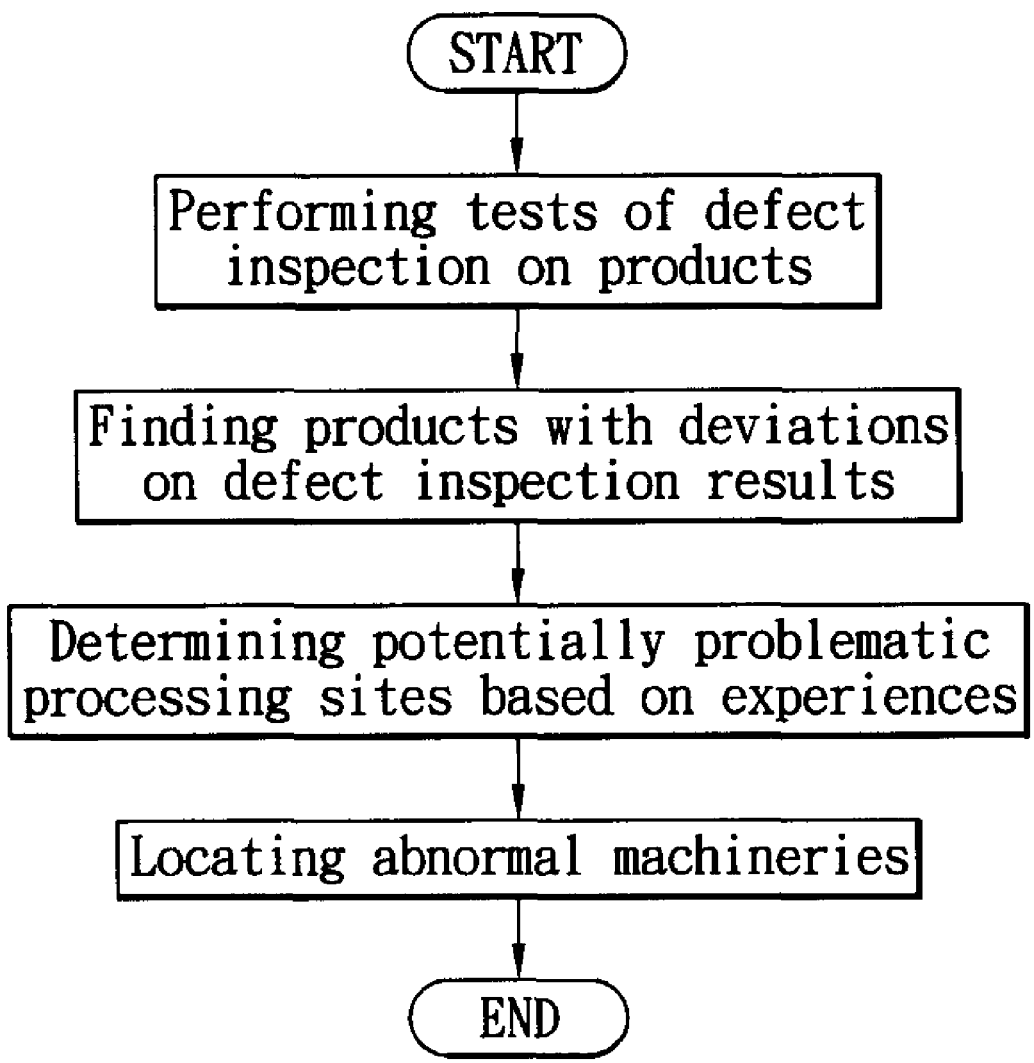
FIG. 1 is a flowchart of a conventional defect inspection analysis.
Figure 2:
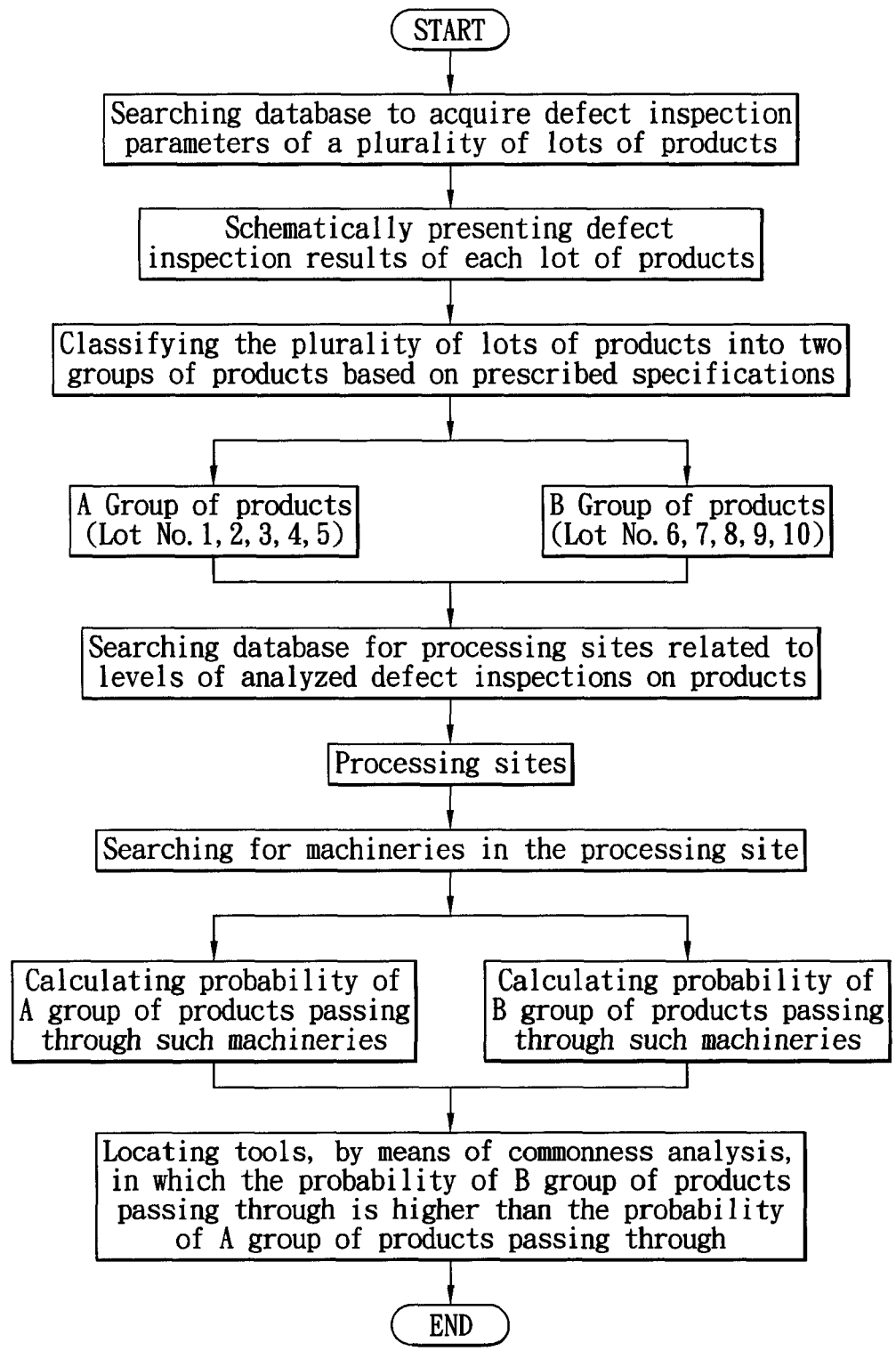
FIG. 2 is a flowchart of a conventional defect inspection parameter analysis method.
Figure 3:
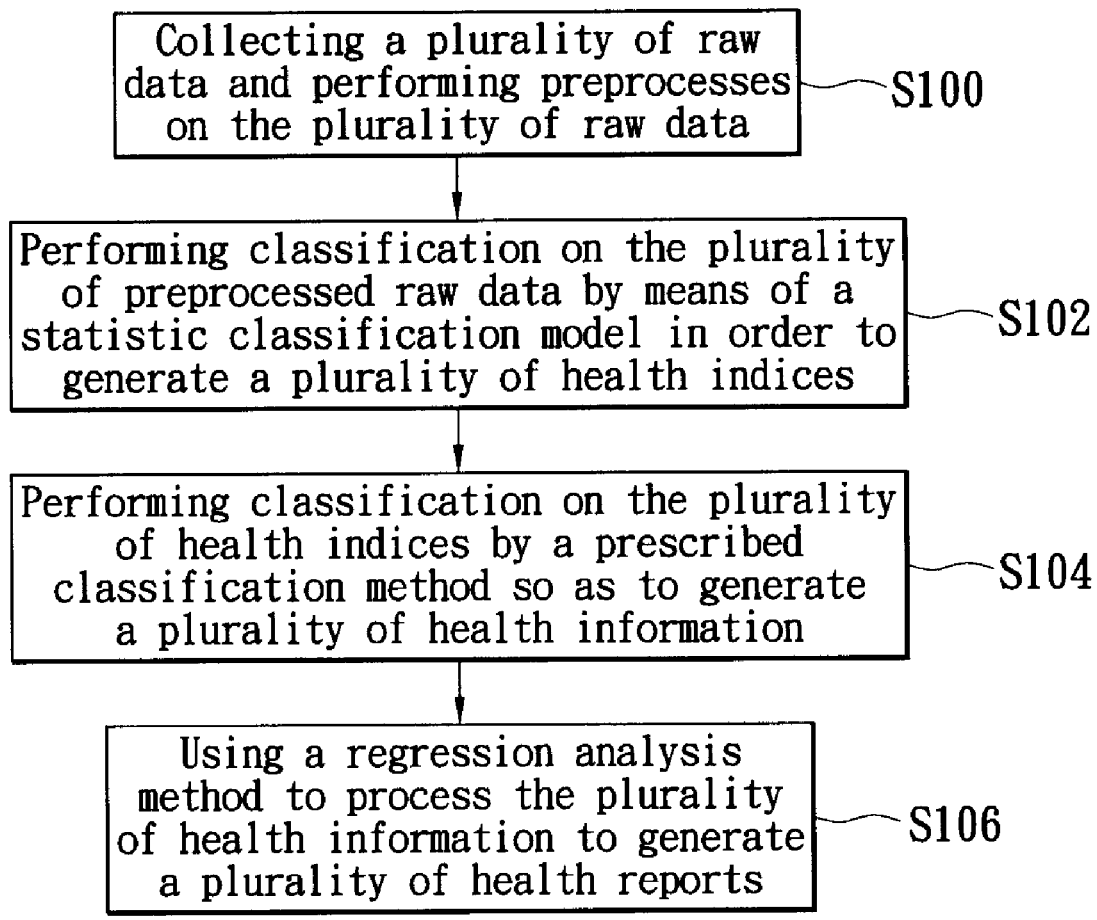
FIG. 3 is a flowchart of the method for prognostic maintenance in semiconductor manufacturing equipments according to the present invention.

Refer now to FIG. 3, wherein the present invention proposes a method for prognostic maintenance in semiconductor manufacturing equipments, and the method for prognostic maintenance in semiconductor manufacturing equipments comprising the following steps:

S100: collecting a plurality of raw data, and performing preprocesses on the plurality of raw data;

S102: performing classification on the plurality of preprocessed raw data by means of a statistic classification model in order to generate a plurality of health indices;

S104: performing classification on the plurality of health indices by a prescribed classification method so as to generate a plurality of health information;

S106: using a regression analysis method to process the plurality of health information to generate a plurality of health reports.

To facilitate those skilled in the art to understand and implement the present invention, herein the detailed descriptions illustrate technical details of the present invention. Initially, in-situ engineers use the Fault Detection and Classification (FDC) system to collect a plurality of raw data, wherein the collected raw data are the variation values detected in real-time on each wafer by the FDC system during semiconductor processes.

Afterward, preprocess the plurality of raw data, which is directed to filter out meaningless null variation values existing in the plurality of raw data, and to generate detection values of normal pattern; and the plurality of raw data further consist of a plurality of historic data and a plurality of newly added data, in which the plurality of historic data indicate the data outputted by the semiconductor equipments under healthy condition in the past, and the plurality of newly added data represent the data outputted by the semiconductor equipment under unknown condition at current time.

Figure 4:
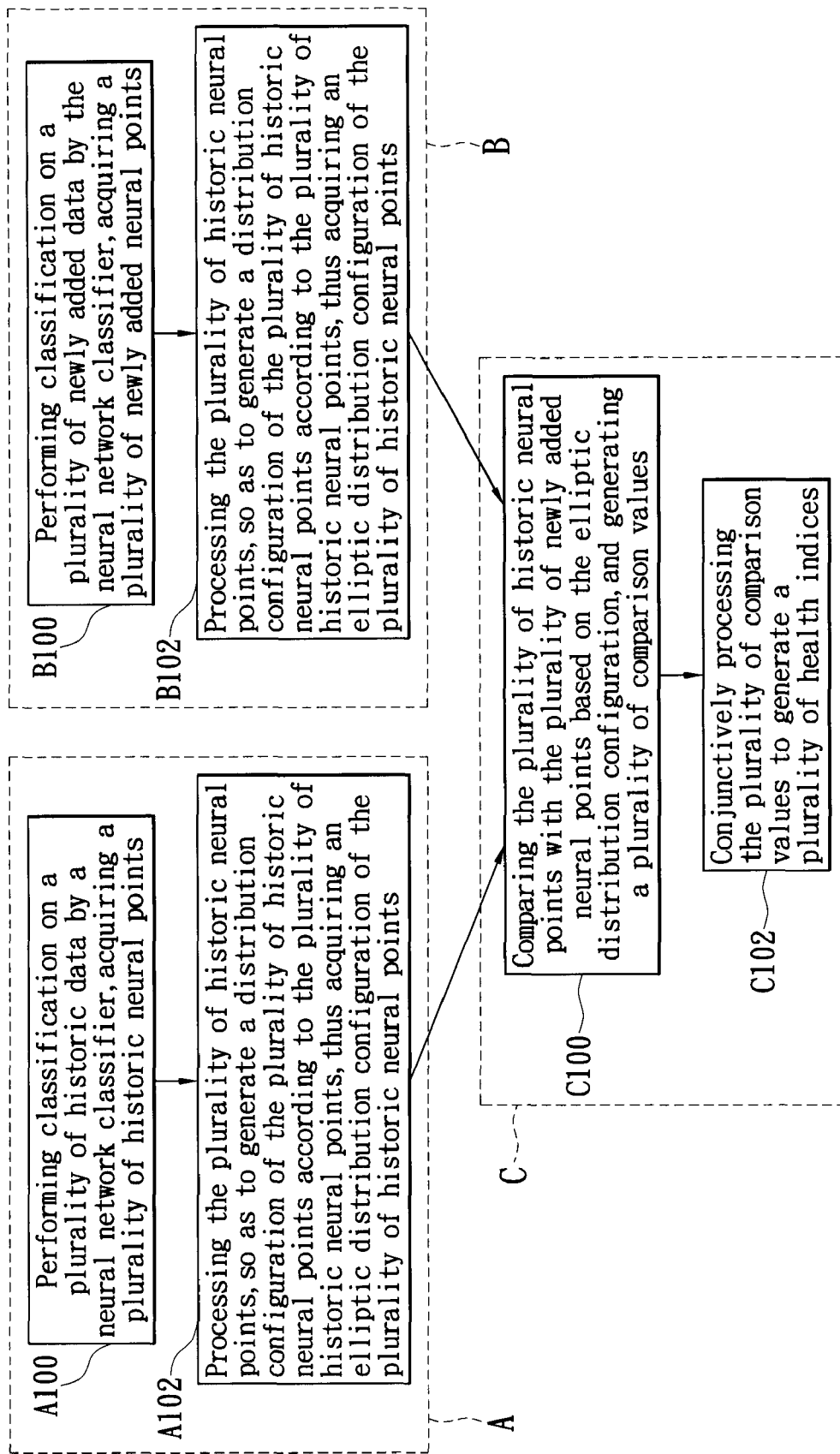
FIG. 4 is a flowchart of the statistic classification model according to the present invention.

Next, use a statistic classification model to process the plurality of preprocessed raw data, which is simply the plurality of raw data after the said preprocess, so as to generate a plurality of health indices, wherein the statistic classification model refers to the Neural Network Model (NN Model), and the steps taken in such a statistic classification model comprise (also refer to FIG. 4):

(A) Learning Phase:

A100: simplifying the plurality of historic data; that is, performing classification on the plurality of historic data by a neural network classifier, acquiring a plurality of historic neural points;

A102: processing the plurality of historic neural points, so as to generate a distribution configuration of the plurality of historic neural points according to the plurality of historic neural points, thus acquiring an elliptic distribution configuration of the plurality of historic neural points.

(B) On-Line Monitoring Phase:

B100: simplifying the plurality of newly added data; that is, performing classification on the plurality of newly added data by the neural network classifier, acquiring a plurality of newly added neural points;

B102: processing the plurality of newly added neural points, so as to generate a distribution configuration of the plurality of newly added neural points according to the plurality of newly added neural points, and building the distribution configuration of the plurality of newly added neural points within the above-said elliptic distribution configuration.

(C) Comparison Phase:

C100: comparing the plurality of historic neural points with the plurality of newly added neural points based on the elliptic distribution configuration, thus generating a plurality of comparison values;

C102: conjunctively processing the plurality of comparison values to generate a plurality of health indices.

Figure 5:
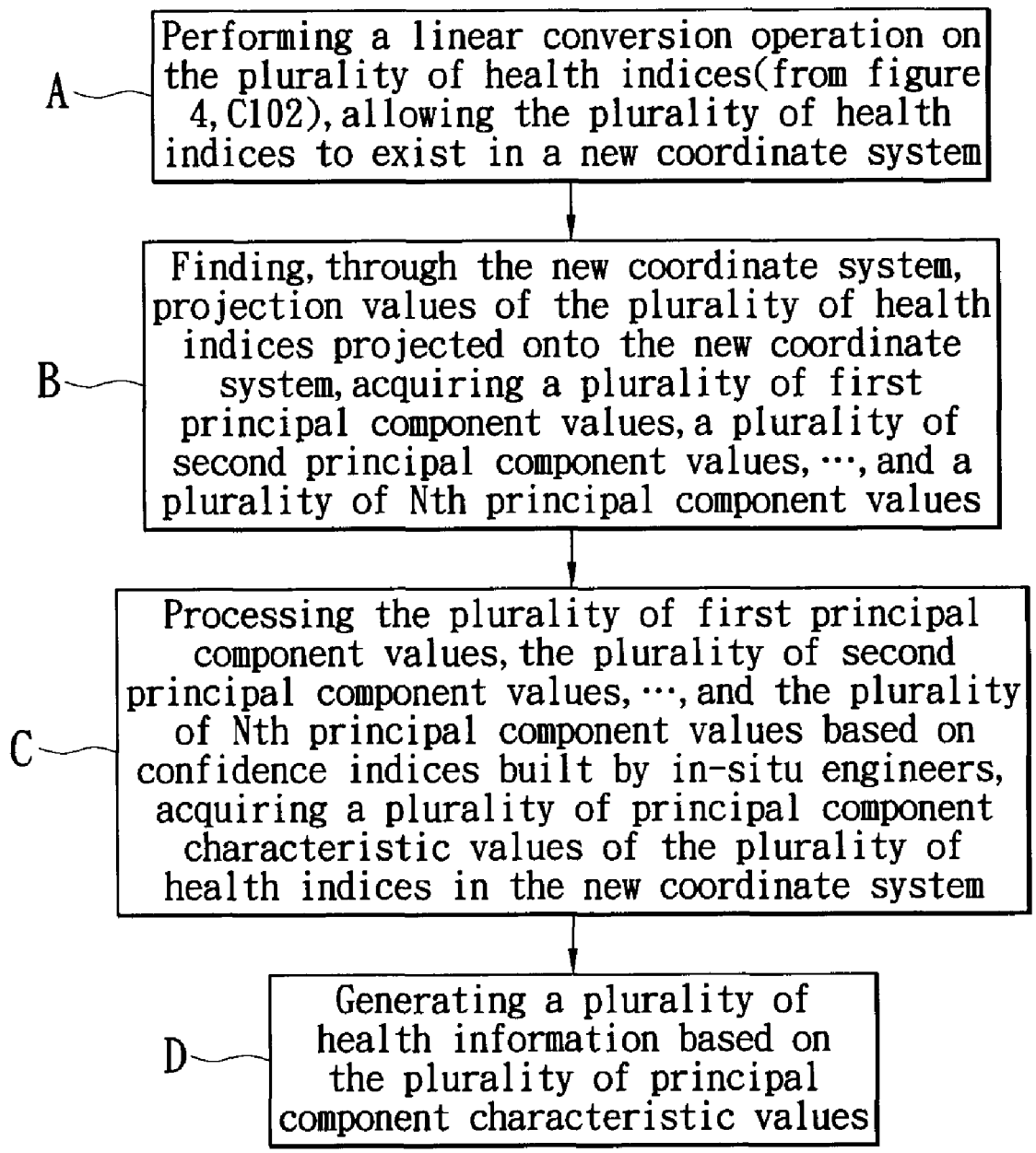
FIG. 5 is a flowchart of the prescribed classification method according to the present invention.

Due to high number of dimensions existing in the plurality of health indices, the significant complexity prevents direct usability thereof by in-situ engineers; accordingly, after acquisition of the plurality of health indices, it is necessary to use a prescribed classification method to perform classification on the plurality of health indices for dimensional reduction, thus generating a plurality of health information, wherein the said prescribed classification method is essentially the Principal Component Analysis (PCA), and the steps taken in the prescribed classification method comprise (also refer to FIG. 5):

(A) performing a linear conversion operation on the plurality of health indices through the PCA; i.e. converting the plurality of health indices in an original coordinate system into a plurality of health indices in a new coordinate system, wherein such a new coordinate system has a plurality of new coordinate axes, and the plurality of new coordinate axes are respectively the first new axis, the second new axis, . . . , and the Nth new axis, wherein the first new axis being referred as the first principal component, second new axis referred as the second principal component, . . . , and Nth new axis referred as the Nth principal component; furthermore, each of the new axes is a linear combination of the original axes in the original coordinate system;

(B) by such a new coordinate system, finding projection values of the plurality of health indices projected onto the plurality of new axes, acquiring a plurality of first principal component values over the first new axis (the first principal components), a plurality of second principal component values over the second new axis (the second principal components), . . . , and a plurality of Nth principal component values over the Nth new axis (the Nth principal components);

(C) analyzing the plurality of first principal component values, plurality of second principal component values, . . . , and plurality of Nth principal component values based on a plurality of confidence indices built by in-situ engineers to acquire a plurality of principal component characteristic values, wherein the plurality of principal component characteristic values indicating the plurality of health indices, wherein the purpose of such confidence indices is intended to simplify the plurality of health indices through retaining lower-rank principal component values but ignoring higher-rank principal component values;

(D) generating a plurality of health information according to the principal component characteristic values of the plurality of health indices.

After acquisition of the plurality of health information, it further processes the plurality of health information by regression analysis to generate a plurality of health reports, wherein the employed regression analysis is the Partial Least Squares Discriminated Analysis (PLS-DA).

Finally, the plurality of health reports are provided to in-situ engineers for assisting in-situ engineers in appreciating the health condition of the semiconductor equipments beforehand, such that in-situ engineers are capable of actively performing related repairs and maintenance thereon.

Accordingly, the method of the present invention has the following advantages:

1. through the method of the present invention, in-situ engineers can appreciate in advance the health level of the semiconductor equipments, allowing to actively perform repairs or maintenance, avoiding subsequent damages to wafers which may cause reduction in wafer yield;

2. the method of the present invention uses simple classification operations, and data after such operation processes can provide in-situ engineers with information concerning health level of the semiconductor equipments;

3. it is still possible to retain original real-time information contents, without any operational losses due to processes which may lead to undesirable distortion in analysis results;

4. it saves significant time and manpower resources, facilitating performance enhancement in semiconductor equipment control and management;

5. it can predict as well as inform in-situ engineers of failure or breakdown in semiconductor equipments early before the occurrences thereof, allowing in-situ engineers to perform required repairs and maintenance on the semiconductor equipments under poor health condition, thereby extending lifespan of the semiconductor equipments.

The aforementioned descriptions simply illustrate the preferred embodiments of the present invention, rather than being used to restrict the scope of the present invention to be legally protected; hence, all effectively equivalent changes or modifications made based on the disclosure of the present invention and appended drawings thereof are reasonably deemed to fall within the scope of the present invention delineated by the subsequent claims.

What is claimed is:

1. A method for prognostic maintenance in semiconductor manufacturing equipments, comprising the steps of:
collecting a plurality of raw data and preprocessing the plurality of collected raw data to filter out meaningless null detection values existing in the plurality of raw data and generate detection values of normal pattern;

performing classification through a statistic classification model on the plurality of preprocessed raw data to generate a plurality of health indices;

performing classification on the plurality of generated health indices by a prescribed classification method to generate a plurality of health information;

using a regression analysis method to process the plurality of health information to generate a plurality of health reports; and performing repairs and maintenance actively by in-situ engineers based on the plurality of generated health reports.

2. The method for prognostic maintenance in semiconductor manufacturing equipments according to claim 1, wherein the statistic classification model is a Neural Network Model (NN Model).

3. The method for prognostic maintenance in semiconductor manufacturing equipments according to claim 2, wherein the plurality of raw data consist of a plurality of historic data and a plurality of newly added data, in which the plurality of historic data indicate the data outputted by the semiconductor equipments under healthy condition, and the plurality of newly added data represent the data outputted by the semiconductor equipment under unknown condition.

4. The method for prognostic maintenance in semiconductor manufacturing equipments according to claim 3, wherein the steps taken by the statistic classification model comprise:
through a learning phase, generating a plurality of historic neural points from the plurality of historic data, and building a distribution configuration of the plurality of historic neural points;

through an on-line monitoring phase, generating a plurality of newly added neural points from the plurality of newly added data, and building a distribution configuration of the plurality of newly added neural points; and by means of a comparison phase, analyzing the distribution configuration of the plurality of historic neural points and the distribution configuration of the plurality of newly added neural points to acquire a plurality of health indices.

5. The method for prognostic maintenance in semiconductor manufacturing equipments according to claim 4, wherein, in the learning phase, the plurality of historic neural points are acquired from the plurality of historic data through classification by a neural network classifier; then the plurality of historic neural points are processed to build the plurality of historic neural points presenting an elliptic distribution configuration.

6. The method for prognostic maintenance in semiconductor manufacturing equipments according to claim 5, wherein, in the on-line monitoring phase, the plurality of newly added neural points are acquired from the plurality of newly added data through processes by the neural network classifier; then the plurality of newly added neural points are processed to build the distribution configuration of the plurality of newly added neural points within the elliptic distribution configuration.

7. The method for prognostic maintenance in semiconductor manufacturing equipments according to claim 6, wherein the comparison phase consists of:
after acquisition of the distribution configuration of the plurality of newly added neural points within the elliptic distribution configuration, comparing the distribution configuration of the plurality of historic neural points with the distribution configuration of the plurality of newly added neural points based on the elliptic distribution configuration, thus generating a plurality of comparison values; and processing conjunctively the plurality of comparison values to generate the plurality of health indices.

8. The method for prognostic maintenance in semiconductor manufacturing equipments according to claim 1, wherein the prescribed classification method is the Principal Component Analysis (PCA).

9. The method for prognostic maintenance in semiconductor manufacturing equipments according to claim 8, wherein the classification performed by the prescribed classification method on the plurality of health indices consists of:

performing a linear conversion operation on the plurality of health indices for classification, in which the linear conversion operation converts the plurality of health indices in an original coordinate system into a new coordinate system, and the new coordinate system has a plurality of new coordinate axes, and the plurality of new coordinate axes are respectively the first new axis, the second new axis, . . . , and the Nth new axis;

finding projection values of the plurality of health indices projected onto the plurality of new axes, acquiring a plurality of first principal component values over the first new axis, a plurality of second principal component values over the second new axis, . . . , and a plurality of Nth principal component values over the Nth new axis;

processing the plurality of first principal component values, plurality of second principal component values, . . . , and plurality of Nth principal component values based on a plurality of confidence indices built by in-situ engineers to acquire a plurality of principal component characteristic values;

generating a plurality of health information according to the plurality of principal component characteristic values.

10. The method for prognostic maintenance in semiconductor manufacturing equipments according to claim 9, wherein the confidence indices simplify the plurality of health indices through retaining lower-rank principal component values and ignoring higher-rank principal component values.

11. A method for prognostic maintenance in semiconductor manufacturing equipments, comprising the steps of:

collecting a plurality of raw data, the plurality of raw data being provided by a Fault Detection and Classification (FDC) system, and the plurality of raw data indicate variation values detected in real-time on each wafer by the FDC system during semiconductor processes, and preprocessing the plurality of collected raw data to filter out meaningless null detection values existing in the plurality of raw data and to generate detection values of normal pattern;

performing classification through a Neural Network (NN) model on the plurality of preprocessed raw data to generate a plurality of health indices;

performing classification on the plurality of generated health indices by the Principal Component Analysis (PCA) to generate a plurality of health information;

using the Partial Least Squares Discriminated Analysis (PLS-DA) to process the plurality of health information to generate a plurality of health reports; and performing repairs and maintenance actively by in-situ engineers based on the plurality of generated health reports.

12. A method for prognostic maintenance in semiconductor manufacturing equipments, comprising the steps of:

collecting a plurality of raw data and preprocessing the plurality of collected raw data, the plurality of raw data consisting of a plurality of historic data and a plurality of newly added data, in which the plurality of historic data indicate the data outputted by the semiconductor equipments under healthy condition, the plurality of newly added data represent the data outputted by the semiconductor equipment under unknown condition;

performing classification through a Neural Network Model (NN Model), on the plurality of preprocessed raw data to generate a plurality of health indices;

performing classification on the plurality of generated health indices by a prescribed classification method to generate a plurality of health information;

using a regression analysis method to process the plurality of health information to generate a plurality of health reports; and performing repairs and maintenance actively by in-situ engineers based on the plurality of generated health reports.

13. The method for prognostic maintenance in semiconductor manufacturing equipments according to claim 12, wherein the steps taken by the NN Model comprise:

through a learning phase, generating a plurality of historic neural points from the plurality of historic data, and building a distribution configuration of the plurality of historic neural points;

through an on-line monitoring phase, generating a plurality of newly added neural points from the plurality of newly added data, and building a distribution configuration of the plurality of newly added neural points; and by means of a comparison phase, analyzing the distribution configuration of the plurality of historic neural points and the distribution configuration of the plurality of newly added neural points to acquire a plurality of health indices.

14. The method for prognostic maintenance in semiconductor manufacturing equipments according to claim 13, wherein, in the learning phase, the plurality of historic neural points are acquired from the plurality of historic data through classification by a neural network classifier; then the plurality of historic neural points are processed to build the plurality of historic neural points presenting an elliptic distribution configuration.

15. The method for prognostic maintenance in semiconductor manufacturing equipments according to claim 14, wherein, in the on-line monitoring phase, the plurality of newly added neural points are acquired from the plurality of newly added data through processes by the neural network classifier; then the plurality of newly added neural points are processed to build the distribution configuration of the plurality of newly added neural points within the elliptic distribution configuration.

16. The method for prognostic maintenance in semiconductor manufacturing equipments according to claim 15, wherein the comparison phase consists of:

after acquisition of the distribution configuration of the plurality of newly added neural points within the elliptic distribution configuration, comparing the distribution configuration of the plurality of historic neural points with the distribution configuration of the plurality of newly added neural points based on the elliptic distribution configuration, thus generating a plurality of comparison values; and processing conjunctively the plurality of comparison values to generate the plurality of health indices.

17. A method for prognostic maintenance in semiconductor manufacturing equipments, comprising the steps of:

collecting a plurality of raw data and preprocessing the plurality of collected raw data;

performing classification through a statistic classification model on the plurality of preprocessed raw data to generate a plurality of health indices;

performing classification on the plurality of generated health indices by Principal Component Analysis (PCA) to generate a plurality of health information, wherein the plurality of health indices consists of:

performing a linear conversion operation on the plurality of health indices for classification, in which the linear conversion operation converts the plurality of health indices in an original coordinate system into a new coordinate system, and the new coordinate system has a plurality of new coordinate axes, and the plurality of new coordinate axes are respectively the first new axis, the second new axis, . . . , and the Nth new axis;

finding projection values of the plurality of health indices projected onto the plurality of new axes, acquiring a plurality of first principal component values over the first new axis, a plurality of second principal component values over the second new axis, . . . , and a plurality of Nth principal component values over the Nth new axis;

processing the plurality of first principal component values, plurality of second principal component values, . . . , and plurality of Nth principal component values based on a plurality of confidence indices built by in-situ engineers to acquire a plurality of principal component characteristic values; and generating a plurality of health information according to the plurality of principal component characteristic values;

using a regression analysis method to process the plurality of health information to generate a plurality of health reports; and performing repairs and maintenance actively by in-situ engineers based on the plurality of generated health reports.

18. The method for prognostic maintenance in semiconductor manufacturing equipments according to claim 17, wherein the confidence indices simplify the plurality of health indices through retaining lower-rank principal component values and ignoring higher-rank principal component values.

* * * * *